United States Patent
Bang et al.

(10) Patent No.: US 7,856,171 B2
(45) Date of Patent: Dec. 21, 2010

(54) METHOD AND APPARATUS FOR EXPRESSING AMOUNT OF CAMERA MOTION

(75) Inventors: Won-chul Bang, Seongnam-si (KR); Dong-yoon Kim, Seoul (KR); Eun-seok Choi, Anvang-si (KR); Sung-lung Cho, Suwon-si (KR); Jong-koo Oh, Suwon-si (KR); Eun-kwang Ki, Seoul (KR); Joon-kee Cho, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 493 days.

(21) Appl. No.: 11/346,274

(22) Filed: Feb. 3, 2006

(65) Prior Publication Data

US 2006/0177207 A1    Aug. 10, 2006

(30) Foreign Application Priority Data

Feb. 4, 2005    (KR) .................... 10-2005-0010858

(51) Int. Cl.
    *G03B 17/00*    (2006.01)
(52) U.S. Cl. ..................................... 396/52; 348/352
(58) Field of Classification Search .................. 396/52; 348/352
    See application file for complete search history.

(56) References Cited

U.S. PATENT DOCUMENTS

| 4,448,510 | A |   | 5/1984  | Murakoshi |             |
|-----------|---|---|---------|-----------|-------------|
| 5,402,197 | A | * | 3/1995  | Okano et al. | 396/55   |
| 5,537,185 | A | * | 7/1996  | Ohishi et al. | 396/55  |
| 5,576,788 | A | * | 11/1996 | Miyazawa et al. | 396/52 |
| 2002/0051634 | A1 | * | 5/2002 | Sato | 396/52 |
| 2003/0193610 | A1 | * | 10/2003 | Nozaki et al. | 348/345 |
| 2004/0119875 | A1 | * | 6/2004 | Hayaishi et al. | 348/362 |
| 2004/0218914 | A1 | * | 11/2004 | Sato | 396/52 |
| 2004/0223073 | A1 | * | 11/2004 | Kanai | 348/345 |

FOREIGN PATENT DOCUMENTS

| JP | 02-172367 | 7/1990 |
| JP | 3-243070 | 10/1991 |
| JP | 8-304866 | 11/1996 |
| JP | 2002-094839 | 3/2002 |

(Continued)

OTHER PUBLICATIONS

Takahashi, Digital Still Camera, May 9, 2003, J.P. Publication No. 2003-134389.*

(Continued)

*Primary Examiner*—Christopher E Mahoney
*Assistant Examiner*—Fang-Chi Chang
(74) *Attorney, Agent, or Firm*—Staas & Halsey LLP

(57) ABSTRACT

A method and apparatus for preventing image blur due to camera motion, and more particularly, to a method and apparatus for sensing a camera motion, calculating an amount of the camera motion based on the sensed camera motion, and expressing the calculated amount of the camera motion to a user so that the user can prevent image blur. The method includes: sensing the camera motion; calculating an amount of the camera motion based on the sensed camera motion; and expressing the calculated amount of the camera motion.

37 Claims, 8 Drawing Sheets

FOREIGN PATENT DOCUMENTS

| JP | 2002-139761 | 5/2002 |
|----|-------------|--------|
| JP | 2002-139762 | 5/2002 |
| JP | 2002-369125 | 12/2002 |
| JP | 2003-134389 | 5/2003 |

OTHER PUBLICATIONS

Translation of JP Publication No. 2002-328408; Camera; Osamu Nonaka; Publication Date: Nov. 15, 2002.*

European Search Report for corresponding European Patent Application No. 06250558 dated Mar. 24, 2009, 8 pages (in English).

Japanese Office Action for corresponding Japanese Patent Application No. 2006-028327 dated Feb. 22, 2009, 2 pgs.

Japanese Office Action for corresponding Japanese Patent Application No. 2006-028327 dated Sep. 15, 2009, 3 pgs.

* cited by examiner

METHOD AND APPARATUS FOR EXPRESSING AMOUNT OF CAMERA MOTION

CROSS-REFERENCE TO RELATED APPLICATION

This application claims the priority of Korean Patent Application No. 10-2005-0010858, filed on Feb. 4, 2005, in the Korean Intellectual Property Office, the disclosure of which is incorporated herein by reference.

BACKGROUND OF THE INVENTION

1. Field of the Invention

The present invention relates to a method and apparatus for preventing image blur due to camera motion, and more particularly, to a method and apparatus for sensing camera motion, calculating an amount of the camera motion based on the sensed camera motion, and expressing the calculated amount of the camera motion so that a user can take steps to prevent image blur.

2. Description of Related Art

When photographing an image using a camera, a motion, such as the tremble or movement of the hand or the body, is transmitted to the camera, and the transmitted motion causes image blur.

Generally, there are two types of camera motion. The first type concerns vertically moving on a lens axis of the camera, and the second type concerns horizontally moving on the lens axis of the camera. The first type is a vertical motion referred to as pitching, and the second type is a horizontal motion referred to as yawing. Whenever a user presses a shutter button of the camera to photograph an image, the camera pitches or yaws.

FIG. 1 illustrates a camera when a beam of light from an object A to be photographed reaches a surface of a film 20 after passing through a lens 10 of the camera. When no motion is transmitted to the camera as shown in FIG. 1A, the beam of light from the object A is accurately focused on a point B of the surface of the film 20. When the camera pitches as shown in FIG. 1B, the beam of light from the object A is focused on a point B' of the surface of the film 20. While a shutter of the camera is open, the beam of light from the object A moves between the points B and B'.

Methods and apparatuses for compensating for sensed camera motion or opening a shutter when the amount of the camera motion does not exceed a predetermined threshold value have been studied to photograph images unaffected by even a little camera motion.

However, conventional image photographing methods and apparatuses do not feed back the amount of the camera motion to a user. Thus, since the user does not know the amount of the camera motion, the user cannot forcibly close the shutter when the amount of the camera motion exceeds a predetermined threshold value, and prevent images photographed from blurring.

BRIEF SUMMARY

An aspect of the present invention provides a method of sensing the motion of a camera, calculating an amount of the motion of the camera, and expressing the motion of the camera based on the calculated amount of the motion of the camera.

An aspect of the present invention also provides an apparatus for sensing the motion of a camera, calculating an amount of the motion of the camera, and expressing the motion of the camera based on the calculated amount of the motion of the camera.

An aspect of the present invention also provides a method of continuously photographing images a predetermined number of times, comparing amounts of the motion of the camera for the photographed images, and displaying the photographed images based on the comparison result.

An aspect of the present invention also provides an apparatus for continuously photographing images a predetermined number of times, comparing amounts of the motion of the camera for the photographed images, and displaying the photographed images based on the comparison result.

According to an aspect of the present invention, there is provided a method of expressing camera motion. The method includes: sensing the camera motion; calculating an amount of the camera motion based on the sensed camera motion; and expressing the calculated amount of the camera motion.

The method may further include opening a shutter when the calculated amount of the camera motion does not exceed a first threshold value and photographing an image.

The first threshold value may be set in any one of a default setting mode, a manual setting mode, and an automatic setting mode.

The method may further include displaying the images continuously photographed. The displaying of the images may include: comparing the amounts of the camera motion corresponding to the images continuously photographed; and displaying the images continuously photographed in an order of the amount of the camera motion based on the comparison result.

According to another aspect of the present invention, there is provided an apparatus for expressing camera motion, including: a motion sensing unit sensing the camera motion; a motion calculation unit calculating an amount of the camera motion based on the sensed camera motion; and a motion expression unit expressing the amount of the camera motion calculated by the motion calculation unit.

The apparatus may further include a photographing unit opening a shutter when the amount of the camera motion expressed by the motion expression unit does not exceed a first threshold value and photographing an image.

The first threshold value may be automatically set based on at least one of a shutter speed, a focal distance, an angle of view, a motion frequency, an amount of motion, a threshold value of a number of blurred pixels, and a degree of openness of an aperture.

The apparatus may further include a continuous photographing control unit controlling the photographing unit to continuously photograph images a predetermined number of times, and the display unit may display the images continuously photographed.

The apparatus may further include a comparison unit comparing the amounts of the camera motion corresponding to the images continuously photographed.

According to another aspect of the present invention, there is provided a method of displaying images photographed by a camera. The method includes: continuously photograph the images a predetermined number of times; sensing camera motion when the images are continuously photographed and calculating an amount of the camera motion based on the sensed camera motion; comparing the amounts of the camera motion corresponding to the images continuously photographed; and displaying the images based on the comparison result.

According to another aspect of the present invention, there is provided an apparatus for displaying images photographed by a camera. The apparatus includes: a continuous photographing control unit controlling a photographing unit to continuously photograph the images a predetermined number of times; a motion sensing unit sensing camera motion when the images are continuously photographed; a motion calculation unit calculating an amount of the camera motion based on the sensed camera motion; a comparison unit comparing the amounts of the camera motion corresponding to the images continuously photographed; and a display unit displaying the images based on the comparison result.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1A:
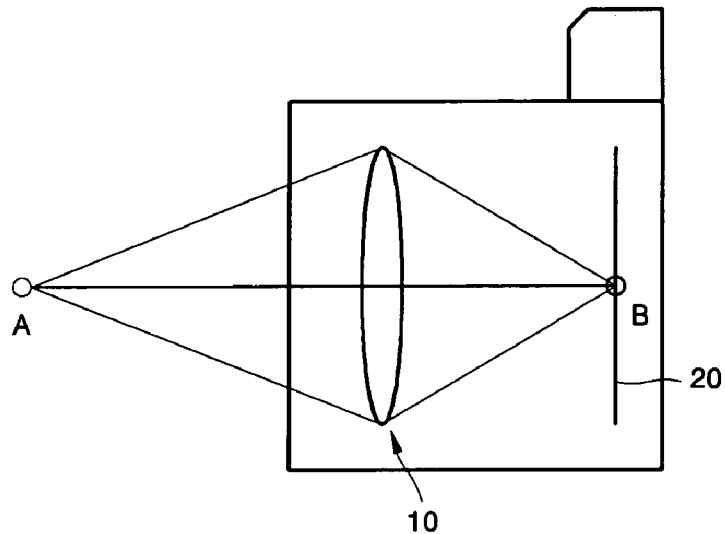
FIGS. 1A-1B illustrate a camera when a beam of light from an object to be photographed reaches a surface of a film after passing through a lens of the camera.
Figure 1B:
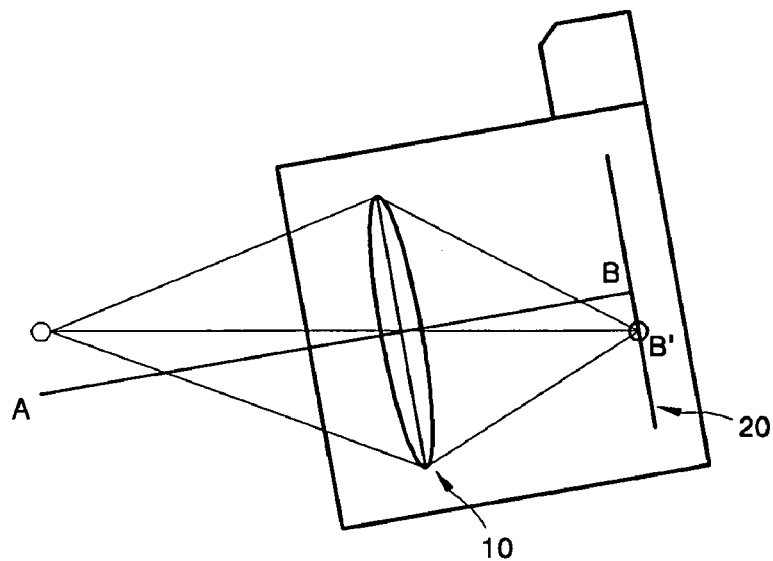

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
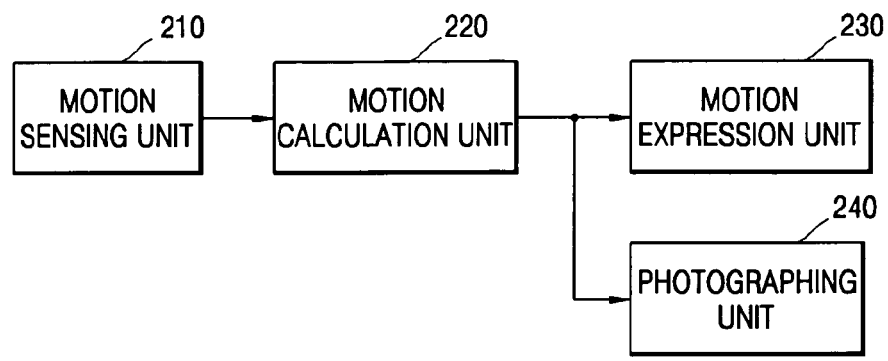
FIG. 2 is a block diagram of an apparatus for expressing camera motion according to an embodiment of the present invention.

FIG. 2 is a block diagram of an apparatus for expressing camera motion according to an embodiment of the present invention. Referring to FIG. 2, the apparatus includes a motion sensing unit 210, a motion calculation unit 220, a motion expression unit 230, and a photographing unit 240.

The motion sensing unit 210 senses a camera motion and generates an electrical signal corresponding to the sensed camera motion. The motion sensing unit 210 may be an accelerometer, an angular velocity sensor, an angular accelerometer, and an impact sensor for measuring the acceleration, angular velocity, and angular acceleration of the camera.

The motion sensing unit 210 may sense the camera motion with respect to one, two, or three axes of a lens of the camera.

The motion calculation unit 220 calculates an amount of the camera motion based on the camera motion sensed by the motion sensing unit 210. Specifically, the motion calculation unit 220 calculates the amount of the camera motion using at least one of a standard deviation, variance, mean, maximum value, minimum value, and norm of a signal indicating the sensed camera motion with respect to at least one of the first through third axes for a predetermined period of time.

Then, the motion calculation unit 220 differentiates or integrates the signal indicating the sensed camera motion at least once and calculates the amount of the camera motion using at least one of the standard deviation, variance, mean, maximum value, minimum value, and norm of the differentiated or integrated signal.

The motion expression unit 230 expresses the amount of the camera motion calculated by the motion calculation unit 220. The motion expression unit 230 expresses the amount of the camera motion using at least one of numerical information, diagrams, icons, changes in color, intensity of sound or different types of sound, intensity of vibration, on/off frequency of light, and intensity of light.

For example, the motion expression unit 230 may express the amount of the camera motion calculated by the motion calculation unit 220 using numbers or diagrams such as bars. The motion expression unit 230 may include a sound generator (not shown), which increases the intensity or frequency of sound according to the calculated amount of the camera motion. In addition, the motion expression unit 230 may include a light emitter (not shown), which may increase the intensity or frequency of light or change the color of light according to the calculated amount of the camera motion.

The motion expression unit 230 may express whether the camera has moved according to whether the calculated amount of the camera motion exceeds a first threshold value. If the calculated amount of the camera motion exceeds the first threshold value and thus it is impossible to take a photograph, the motion expression unit 230 may express this state using a red finger-shaped icon. If the calculated amount of the camera motion does not exceed the first threshold value, the motion expression unit 230 may express this state using a blue finger-shaped icon.

In an embodiment of the present invention, the motion expression unit 230 expresses the amount of camera motion to a photographer. In another embodiment of the present invention, the motion expression unit 230 expresses the amount of the camera motion to a subject to be photographed. In another embodiment of the present invention, the motion expression unit 230 expresses the amount of the camera motion to both the photographer and the subject.

The photographing unit 240 opens a shutter when the amount of the camera motion does not exceed the first threshold value and photographs an image. Specifically, the photographing unit 240 opens the shutter for a predetermined period of time when the amount of the camera motion does not exceed the first threshold value expressed by the motion expression unit 230 and photographs an image.

In an embodiment of the present invention, the first threshold value may be set to a default value (hereinafter referred to as a default setting mode) or may be set manually by a user (hereinafter referred to as a manual setting mode). In another embodiment of the present invention, the first threshold value may be automatically set based on at least one of a shutter speed, focal distance, angle of view, motion frequency, amount of motion, threshold value of the number of blurred pixels, and the degree of openness of an aperture (hereinafter referred to as an automatic setting mode).

For example, the greater the focal distance between a lens of the camera and a charge coupled device (CCD), the narrower the angle of view through the lens, the slower the shutter speed, the greater the effects of the camera motion. In addition, in the case of the same amount of camera motion, an image photographed in a dark place is more blurred than when photographed in a bright place. The first threshold value is automatically set to a value in consideration of at least one of a shutter speed, focal distance, angle of view, motion frequency, amount of motion, threshold value of the number of blurred pixels, and the degree of openness of the aperture.

The threshold value of the number of blurred pixels may be automatically set to a default value or manually set by the user. In addition, the threshold value of the number of the blurred pixels may be set to a value obtained after calculating an average motion of the camera for a predetermined period of time. For example, the threshold value of the number of the blurred pixels may be set according to an amount of hand trembles of the user for a predetermined period of time.

Although the boundary of an actual image is clear, the boundary of the image enlarged on a monitor after being photographed is blurred. It is assumed that the user is satisfied with an image photographed by a 5 mega-pixel camera when 5 or fewer pixels are blurred. In this case, the threshold value of the number of blurred pixels refers to a maximum number of blurred pixels that the user can allow.

If the threshold value of the number of the blurred pixels is set low, the first threshold value is also set low. If the threshold value of the number of blurred pixels is set high, the first threshold value is also set high. Therefore, when the user's hand trembles badly, the user may set the threshold value of the number of blurred pixels high and then take a photograph.

Figure 3:
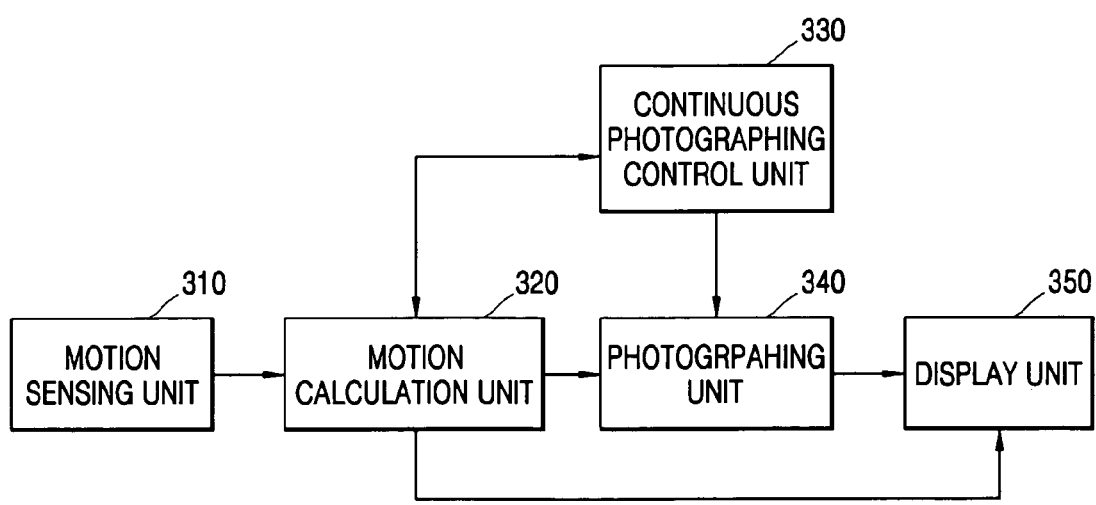
FIG. 3 is a block diagram of an apparatus for expressing camera motion according to another embodiment of the present invention.

FIG. 3 is a block diagram of an apparatus for expressing camera motion according to another embodiment of the present invention. Referring to FIG. 3, the apparatus includes a motion sensing unit 310, a motion calculation unit 320, a continuous photographing control unit 330, a photographing unit 340, and a display unit 350. The motion sensing unit 310 and the motion calculation unit 320 are respectively identical to the motion sensing unit 210 and the motion calculation unit 220 illustrated in FIG. 2, and thus their descriptions will be omitted.

The continuous photographing control unit 330 controls the photographing unit 340 to continuously photograph images a predetermined number of times when the amount of the camera motion calculated by the motion calculation unit 320 does not exceed a first threshold value. Specifically, when the amount of the camera motion calculated by the motion calculation unit 320 does not exceed the first threshold value, the continuous photographing control unit 330 activates the photographing unit 340 the predetermined number of times to continuously photograph images and controls the motion calculation unit 320 to provide to the display unit 350 the amount of the camera motion calculated by the motion calculation unit 320 when the images are photographed.

The display unit 350 displays the images photographed continuously. The display unit 350 may display the amounts of the camera motion for the images calculated by the motion calculation unit 320, together with the images photographed continuously.

Figure 4:
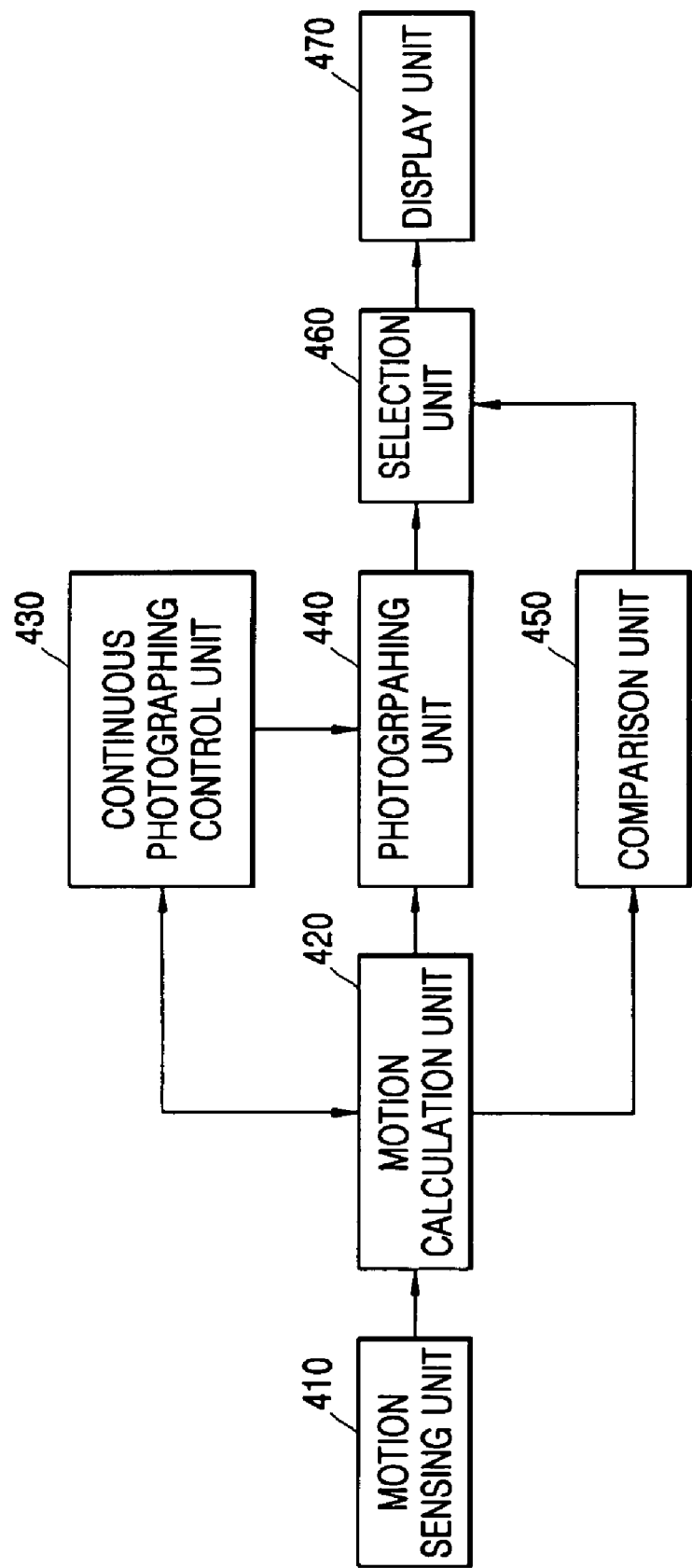
FIG. 4 is a block diagram of an apparatus for expressing camera motion according to another embodiment of the present invention.

FIG. 4 is a block diagram of an apparatus for expressing camera motion according to another embodiment of the present invention. Referring to FIG. 4, the apparatus includes a motion sensing unit 410, a motion calculation unit 420, a continuous photographing control unit 430, a photographing unit 440, a comparison unit 450, a selection unit 460, and a display unit 470. The motion sensing unit 410, the motion calculation unit 420, the continuous photographing control unit 430, and the photographing unit 440 are respectively identical to the motion sensing unit 310, the motion calculation unit 320, the continuous photographing control unit 330 and the photographing unit 340 illustrated in FIG. 3, and thus their descriptions will be omitted.

The comparison unit 450 compares the amounts of the camera motion for the images continuously photographed under the control of the continuous photographing control unit 430. Based on the amounts of the camera motion for the images compared by the comparison unit 450, the selection unit 460 selects an image having the least amount of camera motion. The display unit 470 displays the image selected by the selection unit 460.

In an embodiment of the present invention, the display unit 470 may display the images continuously photographed in order of the amounts of the camera motion for the images compared by the comparison unit 450. In an embodiment of the present invention, the display unit 470 may display the amounts of the motion of the camera for the images continuously photographed, together with the images, in order of the amounts of the camera motion for the images compared by the comparison unit 450.

Figure 5:
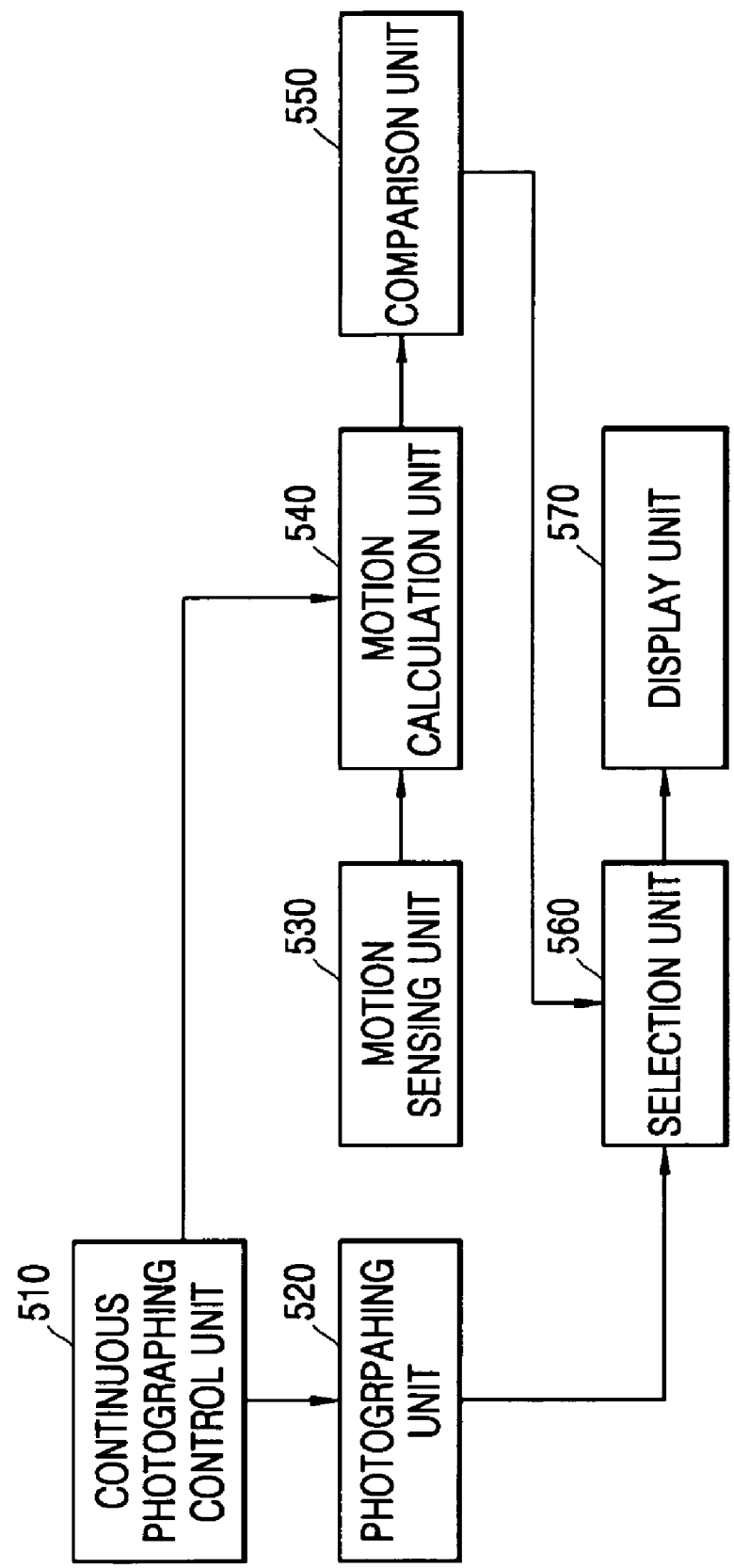
FIG. 5 is a block diagram of an apparatus for displaying an image based on amounts of camera motion when images are continuously photographed according to an embodiment of the present invention.

FIG. 5 is a block diagram of an apparatus for displaying an image based on amounts of camera motion corresponding to images continuously photographed according to an embodiment of the present invention. Referring to FIG. 5, the apparatus includes a continuous photographing control unit 510, a photographing unit 520, a motion sensing unit 530, a motion calculation unit 540, a comparison unit 550, a selection unit 560, and a display unit 570.

When a user command for photographing an image is input via a user interface (not shown), the continuous photographing control unit 510 controls the photographing unit 520 to continuously photograph the image a predetermined number of times. Then, the continuous photographing control unit 510 controls the photographing unit 520 to open the shutter and photograph the image. The user command may be input through a key panel, voice or motion of the user, etc.

The motion sensing unit 530 senses the motion of the camera, such as the acceleration, angular velocity, angular acceleration, and impact of the camera, and generates an electrical signal corresponding to the sensed motion of the camera.

The comparison unit 550 compares the amount of the camera motion for each image calculated by the motion calculation unit 540. Based on the comparison result of the comparison unit 550, the selection unit 560 selects an image having the least amount of camera motion. The selection unit 560 may select a predetermined number of images having the least amount of camera motion, based on the comparison result of the comparison unit 550. The display unit 570 displays the image selected by the selection unit 560.

The display unit 570 may display the images continuously photographed in order of the amounts of the motion of the camera for the images compared by the comparison unit 550. The display unit 570 may display the amounts of the motion of the camera for the images continuously photographed, together with the images, in order of the amounts of the motion of the camera for the images compared by the comparison unit 550, which is within the scope of the present invention.

Figure 6:
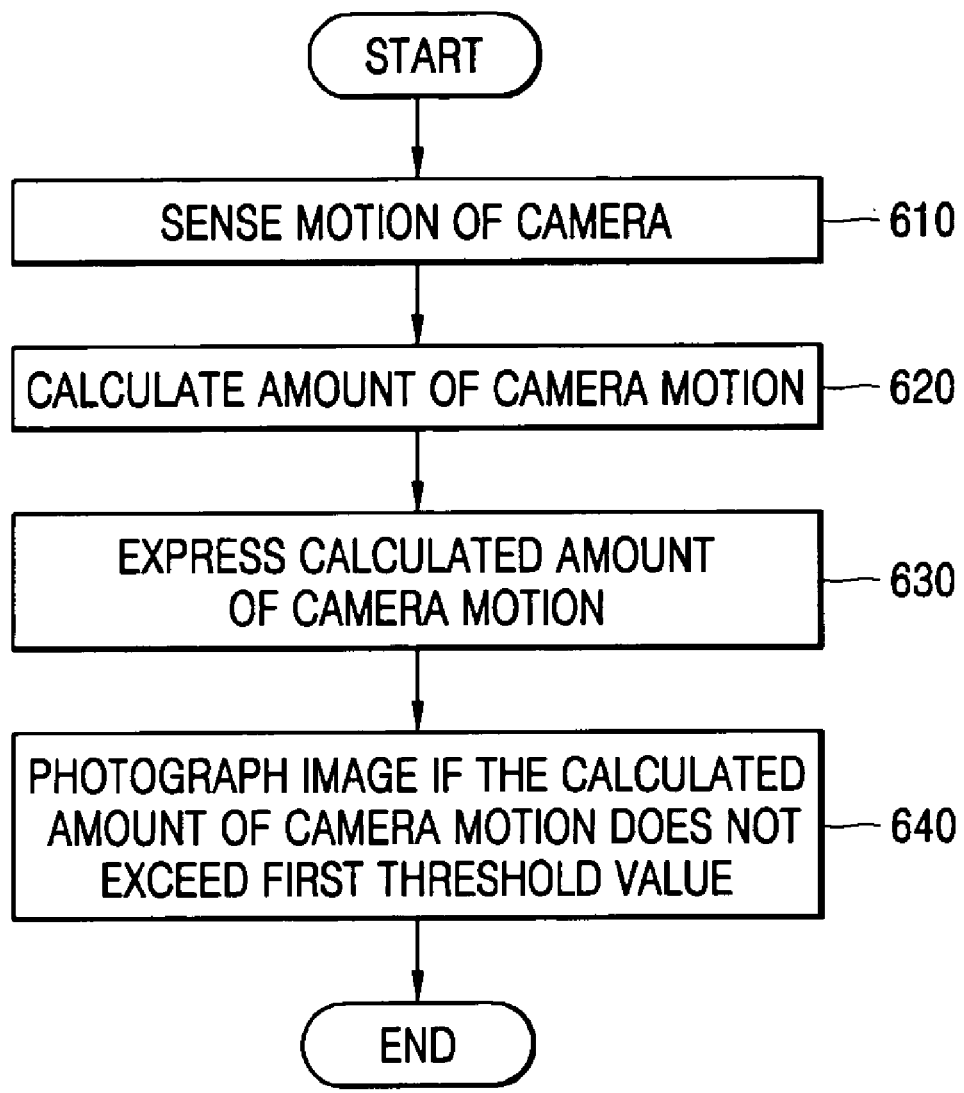
FIG. 6 is a flowchart illustrating a method of expressing camera motion according to an embodiment of the present invention.

FIG. 6 is a flowchart illustrating a method of expressing camera motion according to an embodiment of the present invention. Referring to FIG. 6, the camera motion is sensed and an electrical signal corresponding to the sensed camera motion is generated (operation 610). The camera motion may be the acceleration, angular velocity, and angular acceleration of the camera.

The camera motion with respect to one, two, or three axes of a lens of the camera may be sensed.

Based on the sensed camera motion, the amount of the camera motion is calculated (operation 620). The amount of the camera motion is calculated using at least one of a standard deviation, variance, mean, maximum value, minimum value, and norm of a signal indicating the sensed camera motion with respect to at least one of the first through third axes for a predetermined period of time.

The signal indicating the sensed camera motion is differentiated or integrated at least once, and the amount of the camera motion is calculated using at least one of the standard deviation, variance, mean, maximum value, minimum value, and norm of the differentiated or integrated signal.

Figure 7A:
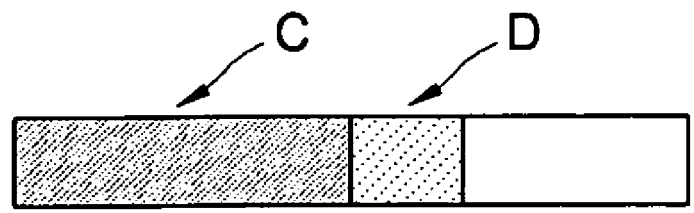
FIGS. 7A-7C illustrate a calculated amount of camera motion according to an embodiment of the present invention.
Figure 7B:
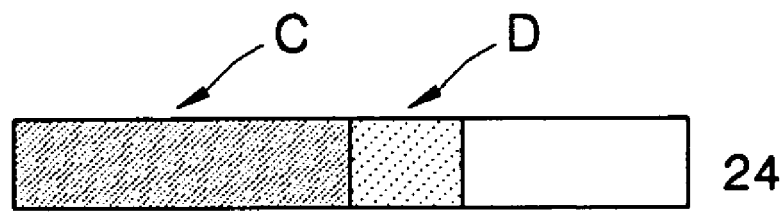
Figure 7C:
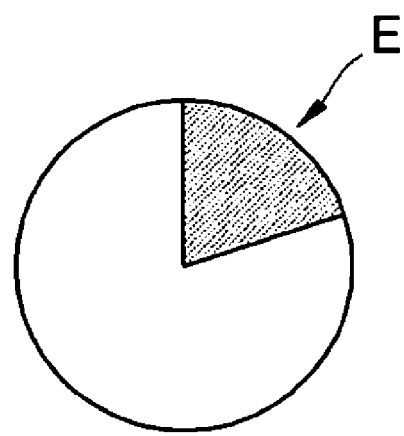

The calculated amount of the camera motion is expressed (operation 630). FIGS. 7A-7C illustrate the calculated amount of the camera motion according to an embodiment of the present invention. Specifically, FIG. 7A shows the calculated amount of the camera motion illustrated using a bar according to an embodiment of the present invention. A portion C of the bar indicates a motion amount corresponding to the first threshold value required to photograph a clear image, and a portion D of the bar indicates the amount of camera motion in the present embodiment.

FIG. 7B illustrates the calculated amount of the camera motion expressed using a bar and a number according to an embodiment of the present invention. FIG. 7C illustrates an amount E of camera motion using a circular graph according to an embodiment of the present invention.

When the amount of the camera motion does not exceed the first threshold value, the shutter is opened and an image is photographed (operation 640). Specifically, when the amount of the camera motion does not exceed the first threshold value, the shutter is opened for a predetermined period of time and an image can be photographed. The first threshold value is automatically set based on at least one of a shutter speed, focal distance, angle of view, motion frequency, amount of motion, and threshold value of the number of blurred pixels.

Figure 8:
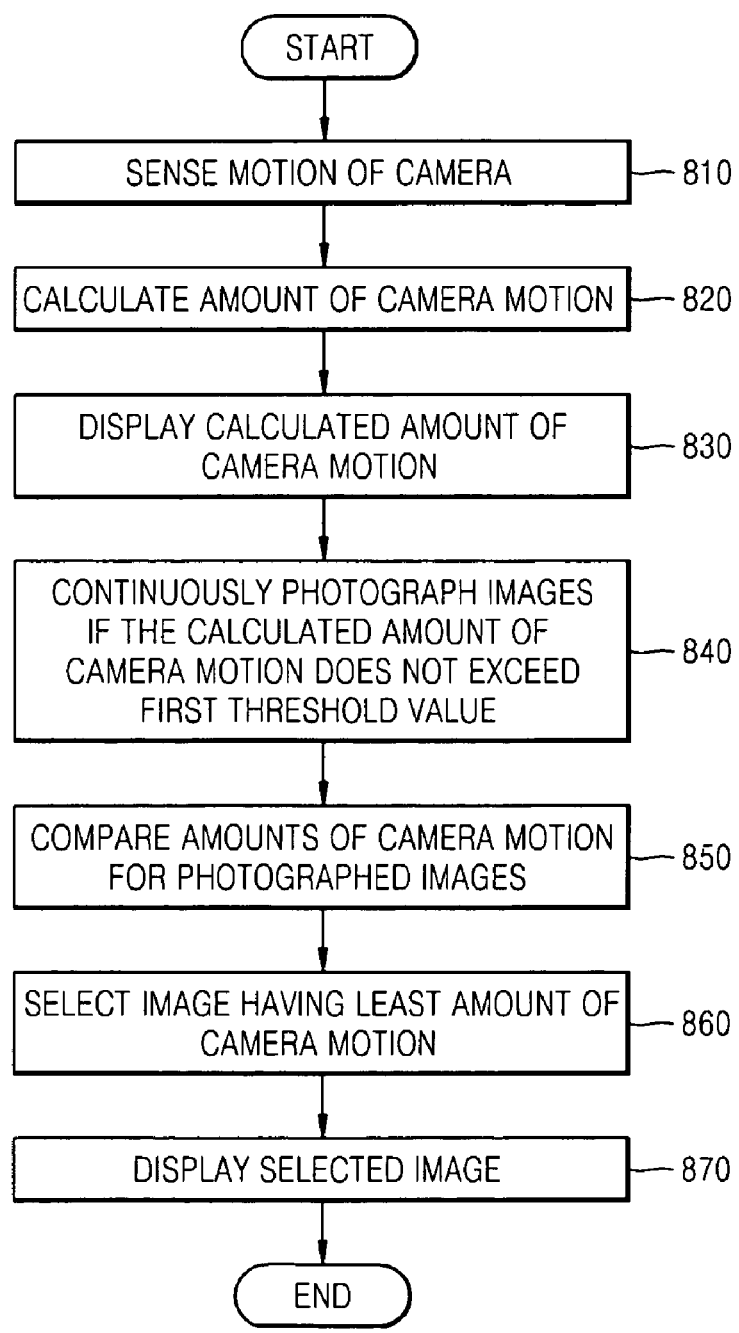
FIG. 8 is a flowchart illustrating a method of expressing camera motion according to another embodiment of the present invention.

FIG. 8 is a flowchart illustrating a method of expressing camera motion according to another embodiment of the present invention. Referring to FIG. 8, the camera motion is sensed (operation 810) and the amount of the camera motion is calculated based on the sensed camera motion (operation 820). The calculated amount of the camera motion is displayed on a display unit (not shown) (operation 830). If the amount of the camera motion displayed on the display unit does not exceed a first threshold value, images are continuously photographed a predetermined number of times (operation 840). The amounts of the camera motion for the images continuously photographed are compared (operation 850), and an image having the least amount of camera motion is selected based on the comparison result (operation 860). The selected image is then displayed (operation 870).

The images continuously photographed may be displayed in order of the amounts of the camera motion based on the comparison result. The amounts of the camera motion for the images continuously photographed may be displayed together with the images photographed in order of the amounts of the camera motion based on the comparison result.

Figure 9:
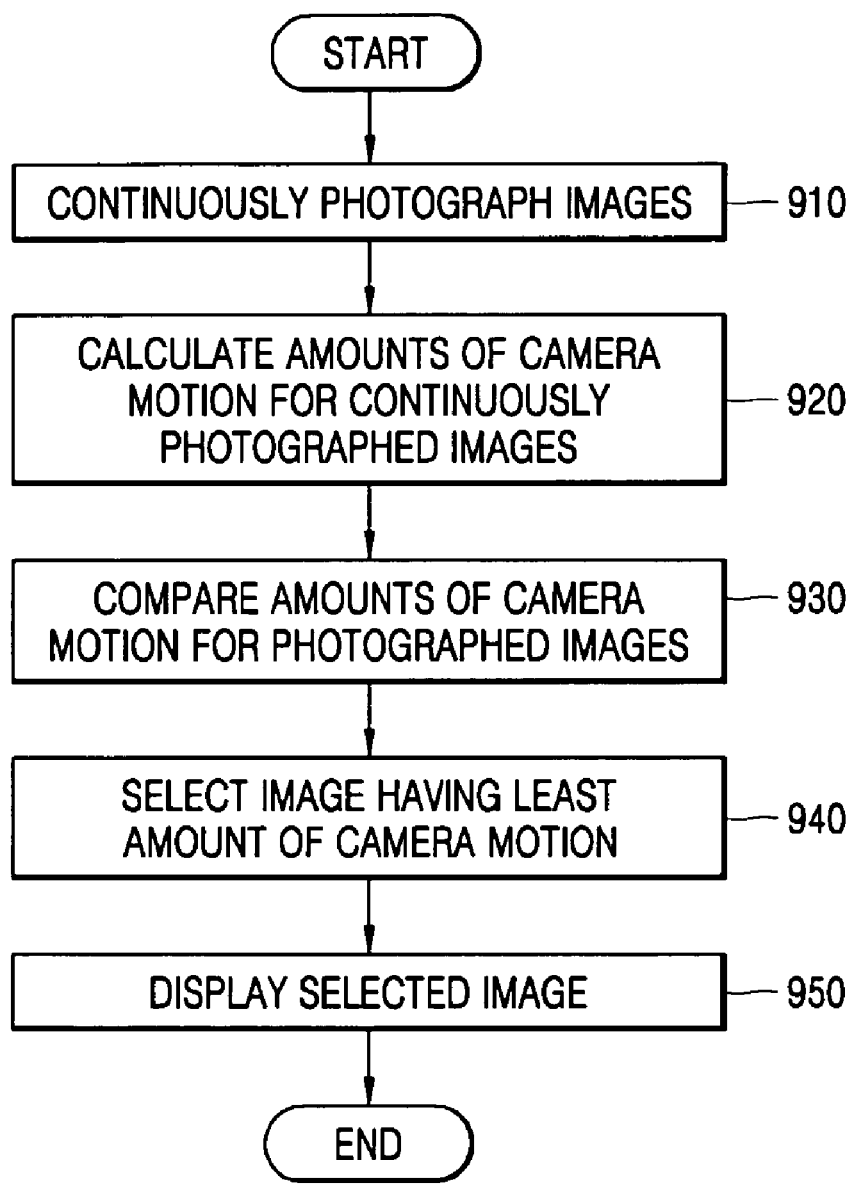
FIG. 9 is a flowchart illustrating a method of displaying an image based on amounts of camera motion when images are continuously photographed according to an embodiment of the present invention.

FIG. 9 is a flowchart illustrating a method of displaying an image based on the amounts of camera motion corresponding to images continuously photographed according to an embodiment of the present invention. Referring to FIG. 9, when a user command for photographing an image is input, the image is continuously photographed a predetermined number of times (operation 910).

The camera motion, such as the acceleration, angular velocity, angular acceleration, and impact of the camera, is sensed and the amount of the camera motion is calculated based on the sensed camera motion (operation 920).

The calculated amounts of the camera motion corresponding to the images are compared (operation 930), and an image having the least amount of camera motion is selected based on the comparison result (operation 940). A predetermined number of images having the least amount of camera motion may be selected based on the comparison result. The selected image is displayed (operation 950).

The images continuously photographed may be displayed in order of the amounts of the camera motion corresponding to the images based on the comparison result. The amounts of the camera motion corresponding to the images continuously photographed may be displayed together with the images photographed in order of the amounts of the camera motion based on the comparison result.

As described above, according to a method and apparatus for expressing camera motion according to the present invention, an amount of the camera motion is expressed so that a user can recognize the amount of the camera motion. When the amount of the camera motion does not exceed a predetermined first threshold value, a shutter is opened and an image can be photographed. In this case, the amount of the camera motion is expressed so that the user can estimate the time when the amount of the camera motion does not exceed the first threshold value.

Embodiments of the present invention can also be implemented as computer-readable code on a computer-readable recording medium. The computer-readable recording medium is any data storage device that can store data which can be thereafter read by a computer system. Examples of the computer-readable recording medium include magnetic storage mediums (such as read-only memory (ROM), floppy disks, and hard disks), optical reading mediums (such as CD-ROMs and DVDs), and carrier waves (such as data transmission through the Internet).

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for expressing camera motion of a camera, the apparatus comprising: a motion sensing unit to sense the camera motion; a motion calculation unit to calculate an amount of the camera motion based on the sensed camera motion; a motion expression unit configured to express varying amounts of camera motion to one or more of a user and a subject based on the amount of the camera motion calculated by the motion calculation unit; a photographing unit to continuously photograph a predetermined number of images; and a continuous photographing control unit to control the photographing unit to continuously photograph the predetermined number of images when the sensed camera motion does not exceed a predetermined threshold value, wherein the predetermined threshold value is a number of blurred pixels and is set according to an average motion of the camera calculated over a predetermined time.

2. The apparatus of claim 1, wherein the predetermined threshold value is set in any one of a default setting mode, a manual setting mode, and an automatic setting mode.

3. The apparatus of claim 2, wherein the predetermined threshold value in the automatic setting mode or the default setting mode is set based on at least one of a shutter speed, a focal distance, an angle of view, a motion frequency, an amount of motion, a threshold value of a number of blurred pixels, and a degree of openness of an aperture.

4. The apparatus of claim 3, wherein the predetermined threshold value of the number of blurred pixels is set in any one of the default setting mode, the manual setting mode, and the automatic setting mode.

5. The apparatus of claim 1, wherein the motion expression unit expresses the calculated amount of the camera motion or the predetermined threshold value.

6. The apparatus of claim 5, wherein the calculated amount of the camera motion or the predetermined threshold value is expressed using at least one of numerical information, diagrams, icons, changes in color, intensity of sound or different types of sound, an intensity of vibration on/off frequency of light, and an intensity of light.

7. The apparatus of claim 1, wherein the motion expression unit expresses whether the camera has moved according to whether the calculated amount of the camera motion exceeds the first threshold value.

8. The apparatus of claim 7, wherein the motion expression unit is a display unit.

9. An apparatus for expressing camera motion of a camera, the apparatus comprising: a motion sensing unit sensing the camera motion; a motion calculation unit calculating an amount of the camera motion based on the sensed camera motion; a motion expression unit configured to express varying amounts of camera motion to at least one of a user and a subject based on the amount of the camera motion calculated by the motion calculation unit; a photographing unit opening a shutter when the amount of the camera motion expressed by the motion expression unit does not exceed a first threshold value and photographing an image; and a continuous photographing control unit controlling the photographing unit to continuously photograph images a predetermined number of times when the sensed camera motion does not exceed a predetermined threshold value, wherein the predetermined threshold value is a number of blurred pixels and is set according to an average motion of the camera calculated over a predetermined time.

10. The apparatus of claim 9, further comprising a comparison unit comparing the amounts of the camera motion corresponding to the images continuously photographed.

11. The apparatus of claim 10, wherein the motion expression unit displays the images continuously photographed in an order of the amount of the camera motion based on the comparison result of the comparison unit.

12. The apparatus of claim 11, wherein the motion expression unit displays the amount of the camera motion calculated by the motion calculation unit together with the images continuously photographed.

13. The apparatus of claim 10, wherein the apparatus further comprises a selection unit selecting an image having a least amount of the camera motion based on the comparison result of the comparison unit, and the motion expression unit displays the image selected by the selection unit.

14. An apparatus for displaying images photographed by a camera, the apparatus comprising: a motion sensing unit sensing camera motion when the images are continuously photographed; a continuous photographing control unit controlling a photographing unit to continuously photograph the images a predetermined number of times when the sensed camera motion does not exceed a predetermined threshold value, wherein the predetermined threshold value is a number of blurred pixels and is set according to an average motion of the camera calculated over a predetermined time; a motion calculation unit calculating an amount of the camera motion based on the sensed camera motion; a comparison unit comparing the amounts of the camera motion corresponding to the images continuously photographed; and a display unit displaying the images based on the comparison result of the comparison unit.

15. The apparatus of claim 14, wherein the display unit displays the images continuously photographed in an order of the amount of the camera motion based on the comparison result of the comparison unit.

16. The apparatus of claim 15, wherein the display unit displays the amount of the camera motion calculated by the motion calculation unit together with the images continuously photographed.

17. The apparatus of claim 14, wherein the apparatus further comprises a selection unit selecting an image having a least amount of the camera motion based on the comparison result of the comparison unit, and the display unit displays the image selected by the selection unit.

18. A method of expressing camera motion in a camera, the method comprising: sensing the camera motion; calculating an amount of the camera motion based on the sensed camera motion; expressing varying amounts of camera motion to one or more of a user and a subject based on the calculated amount of the camera motion; opening a shutter a predetermined number of times when the calculated amount of the camera motion does not exceed a first threshold value and photographing a predetermined number of images, wherein the first threshold value is a number of blurred pixels and is set according to an average motion of the camera calculated over a predetermined time.

19. The method of claim 18, wherein the first threshold value is set in any one of a default setting mode, a manual setting mode, and an automatic setting mode.

20. The method of claim 19, wherein the first threshold value in the automatic setting mode or the default setting mode is set based on at least one of a shutter speed, a focal distance, an angle of view, a motion frequency, an amount of motion, a threshold value of a number of blurred pixels, and a degree of openness of an aperture.

21. The method of claim 20, wherein the threshold value of the number of the blurred pixels is set in any one of the default setting mode, the manual setting mode, and the automatic setting mode.

22. The method of claim 19, wherein, in the expression of the calculated amount of the camera motion, the calculated amount of the camera motion or the first threshold value is expressed.

23. The method of claim 22, wherein the calculated amount of the camera motion or the first threshold value is expressed using at least one of numerical information, diagrams, icons, changes in color, intensity of sound or different types of sound, an intensity of vibration, on/off frequency of light, and an intensity of light.

24. The method of claim 19, wherein, in the expression of the calculated amount of the camera motion, expresses whether the camera has moved according to whether the calculated amount of the camera motion exceeds the first threshold value.

25. A method of expressing camera motion in a camera, the method comprising: sensing the camera motion; calculating an amount of the camera motion based on the sensed camera motion; displaying varying amounts of camera motion to at least one of a user and a subject based on the calculated amount of camera motion as the amount of camera motion changes with time; and continuously photographing images a predetermined number of times when the calculated amount of the camera motion does not exceed a first threshold value, wherein the first threshold value is a number of blurred pixels and is set according to an average motion of the camera calculated over a predetermined time.

26. The method of claim 25, further comprising displaying the images continuously photographed.

27. The method of claim 26, wherein the displaying of the images comprises:
comparing the amounts of the camera motion corresponding to the images continuously photographed; and
displaying the images continuously photographed in an order of the amount of the camera motion based on the comparison result.

28. The method of claim 27, wherein, in the displaying of the images continuously photographed in the order of the amount of the camera motion, the calculated amount of the camera motion is displayed together with the images continuously photographed.

29. The method of claim 26, wherein the displaying of the images comprises:
comparing the amounts of the camera motion corresponding to the images continuously photographed;
selecting an image having a least amount of the camera motion based on the comparison result; and
displaying the selected image.

30. The method of claim 25, wherein the first threshold value may be automatically set to a value obtained after calculating an average motion of the camera for a period of time.

31. A computer-readable recording medium storing processing instructions for causing a processor to execute a method of expressing camera motion in a camera, the method comprising: sensing the camera motion; calculating an amount of the camera motion based on the sensed camera motion; expressing varying amounts of camera motion to one or more of a user and a subject based on the calculated amount of the camera motion; and opening a shutter a predetermined number of times when the calculated amount of the camera motion does not exceed a first threshold value and photographing a predetermined number of images, wherein the first threshold value is a number of blurred pixels and is set according to an average motion of the camera calculated over a predetermined time.

32. A computer-readable recording medium storing processing instructions for causing a processor to execute a method of expressing camera motion in a camera, the method comprising: sensing the camera motion; calculating an amount of the camera motion based on the sensed camera motion; displaying varying amounts of camera motion to at least one of a user and a subject based on the calculated amount of camera motion as the amount of camera motion changes with time; and continuously photographing images a predetermined number of times when the calculated amount of the camera motion does not exceed a first threshold value, wherein the first threshold value is a number of blurred pixels and is set according to an average motion of the camera calculated over a predetermined time.

33. A method of displaying images photographed by a camera, the method comprising: continuously photographing the images a predetermined number of times when the calculated amount of the camera motion does not exceed a first threshold value, wherein the first threshold value is a number of blurred pixels and is set according to an average motion of the camera calculated over a predetermined time; sensing camera motion when the images are continuously photographed and calculating an amount of the camera motion based on the sensed camera motion; comparing the amounts of the camera motion corresponding to the images continuously photographed; and displaying the images based on the comparison result.

34. The method of claim 33, wherein, in the displaying of the images, the images continuously photographed are displayed in an order of the amount of the camera motion based on the comparison result.

35. The method of claim 34, wherein, in the displaying of the images, the calculated amount of the camera motion is displayed together with the images continuously photographed.

36. The method of claim 33, wherein the method further comprises selecting an image having a least amount of the camera motion based on the comparison result, and the selected image is displayed in the displaying of the images.

37. A computer-readable recording medium storing processing instructions for causing a processor to execute a method of displaying images photographed by a camera, the method comprising: continuously photographing the images a predetermined number of times when the calculated amount of the camera motion does not exceed a first threshold value, wherein the first threshold value is a number of blurred pixels and is set according to an average motion of the camera calculated over a predetermined time; sensing camera motion when the images are continuously photographed and calculating an amount of the camera motion based on the sensed camera motion; comparing the amounts of the camera motion corresponding to the images continuously photographed; and displaying the images based on the comparison result.

* * * * *

UNITED STATES PATENT AND TRADEMARK OFFICE
CERTIFICATE OF CORRECTION

PATENT NO. : 7,856,171 B2
APPLICATION NO. : 11/346274
DATED : December 21, 2010
INVENTOR(S) : Won-chul Bang et al.

It is certified that error appears in the above-identified patent and that said Letters Patent is hereby corrected as shown below:

Title Page, Item (75) (Inventors), Line 3, delete "Anvang-si" and insert --Anyang-si--, therefor.

Column 9, Line 21, In Claim 6, delete "vibration" and insert --vibration,--, therefor.

Column 9, Line 26, In Claim 7, delete "first" and insert --predetermined--, therefor.

Column 10, Line 30, In Claim 18, delete "opening" and insert --and opening--, therefor.

Signed and Sealed this
Twenty-sixth Day of April, 2011

David J. Kappos
*Director of the United States Patent and Trademark Office*